April 29, 1969 — W. R. KING — 3,441,923

AUTOMATED METER READING SYSTEM

Filed Jan. 10, 1966

INVENTOR.
WILLIAM R. KING
BY Fishburn & Gold
ATTORNEY

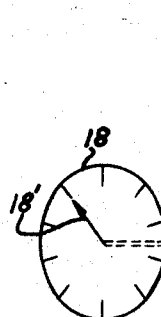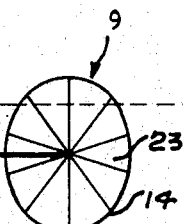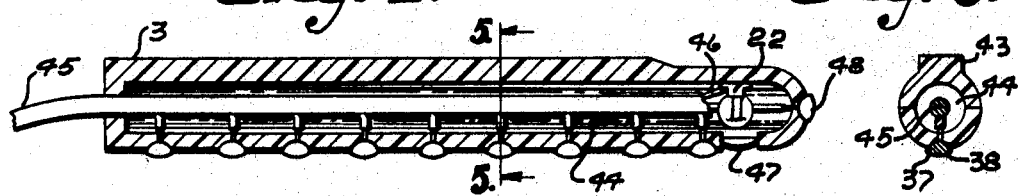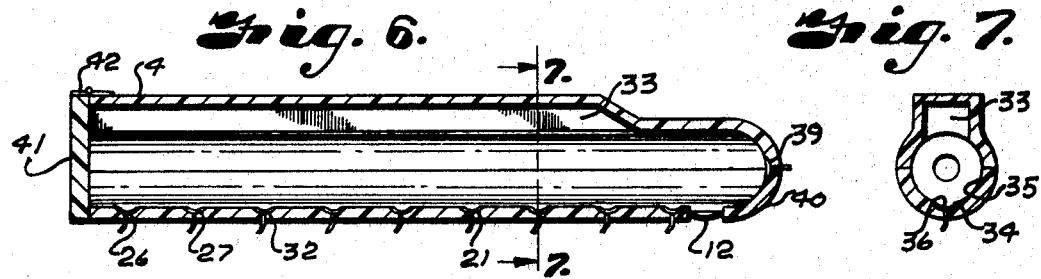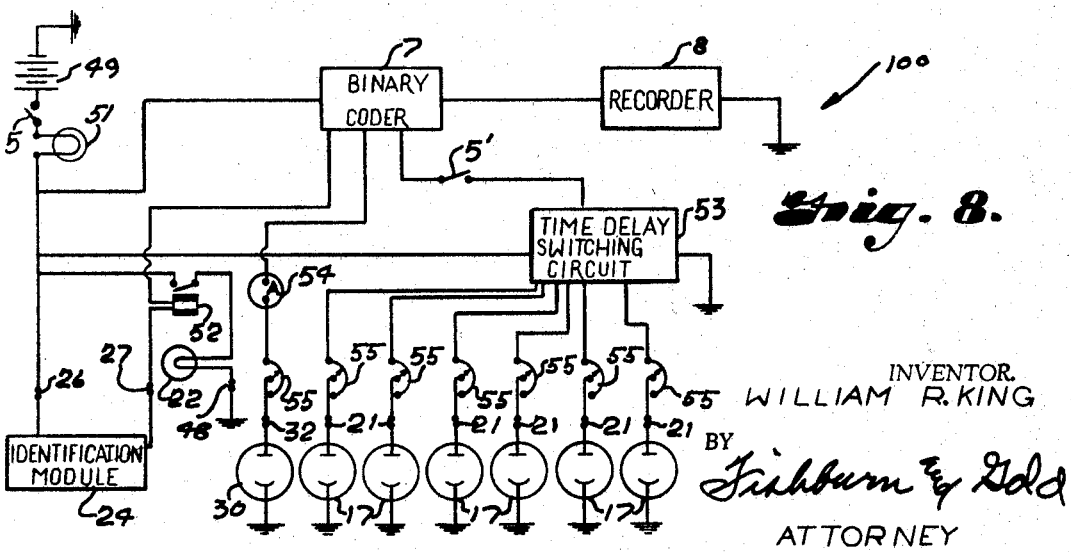

April 29, 1969     W. R. KING     3,441,923
AUTOMATED METER READING SYSTEM
Filed Jan. 10, 1966

INVENTOR.
WILLIAM R. KING
BY
Fishburn and Gold
ATTORNEYS

…

United States Patent Office 3,441,923
Patented Apr. 29, 1969

3,441,923
AUTOMATED METER READING SYSTEM
William R. King, Liberal, Kans., assignor to Anadasko
  Production Company, Liberal, Kans., a corporation of
  Delaware
Filed Jan. 10, 1966, Ser. No. 519,668
Int. Cl. G08u *19/00, 25/04*
U.S. Cl. 340—188                 4 Claims

ABSTRACT OF THE DISCLOSURE

A meter reading and recording system having a meter arranged to indicate the quantity of material passing therethrough with a light source and photosensitive members to sense the meter reading and provide responses having a level of intensity related to the quantity reading. A probe movable into a socket in the metering device to make electrical contact whereby the signal is transmitted and converted to a binary code which may be recorded on a recording means to show the meter reading, the meter and the sensing apparatus including a code signal indicating the particular meter being read.

---

This invention pertains to metering devices and more particularly, to an automatic meter reading and recording system for use on metering devices and the like.

Heretofore, metering devices such as residential electric and gas meters have been read by the time consuming method of an individual optically viewing a plurality of dials extracting the readings from said dials and manually scribing said readings in some record keeping means such as a book. A method of this nature is both time consuming and subject to error in either the viewing or scribing stages.

It is, therefore, the object of my invention to provide an automatic meter reading and recording system for utilization on electric and gas meters or the like which eliminates the viewing and scribing stages mentioned above, thus reducing the time required for meter reading and eliminating the errors resulting from the human element; to provide a meter reading and recording system which automatically extracts the meter reading and records said reading on a data processing input means; to provide a metering device of a conventional nature having one or more members moved by the material being metered to singularly or collectively indicate the quantity or quality of said material with an apparatus therein operatively connected to said member or members for emitting an electrical signal or response whose intensity or characteristics can indicate in a predetermined manner the particular quantity or quality reading of the metering device; to provide a metering device adapted for automatic meter reading and recording which is comprised of a plurality of transparent rotatable discs operatively connected to the visual dials of said meter, each disc having a plurality of radial segments, each segment varying in degrees of transparency, each of the varying degrees of transparency corresponding to the calibration of the visual dial; a light transmission means which will transmit a beam of light from a light source to a position adjacent the transparent disc to thereby pass said beam of light through the radial segment of the rotatable transparent disc which is then located to receive said light beam, a plurality of sensitive devices located on the opposite side of the transparent disc from said light beam to receive the light beam after said beam passes through the transparent disc and to emit an electrical response corresponding in strength to the intensity of light passed through the radial segment of the transparent disc, a socket in said metering device having a plurality of contacts operatively connected to each of the photosensitive devices to receive the electrical response therefrom with at least two contacts connected to an identification module which will identify the particular meter which is being read, said socket also including a lens which serves to transmit light to the light transmission means; to provide an automatic portable meter reader-recorder device comprised of a probe insertable in the aforestated socket of said metering device, said probe having a plurality of contacts engageable with the contacts of said socket and a light source which will lie in communication with the lens of the socket when said probe is inserted in said socket, a digital coder operatively connected to the contacts of said probe to receive the electrical responses from the photoelectric cells and to convert said responses to digital characters, a recorder operatively connected to the digital coder to receive the digital characters from said coder and to record same on a data processing input means, and a power source operatively connected to the recorder, coder, identification module and light source in said probe to provide power thereto; to provide a relatively simple automatic meter reading system utilizing convention elements and conventional metering devices which may be manufactured at a low cost and which are sufficiently rugged to withstand field utilization.

Other objects and advantages of this invention will become apparent from the following description taken in connection with the accompanying drawings wherein are set forth by way of illustration and example certain embodiments of this invention.

FIG. 3 is a diagrammatic view of the basic components of the automatic meter reading apparatus contained in the metering device.

FIG. 4 is a cross-sectional view of the probe of the meter reader recording apparatus.

FIG. 5 is a cross-sectional view of said probe taken along lines 5—5 of FIG. 4.

FIG. 6 is a cross-sectional view of the socket in the metering device.

FIG. 7 is a cross-sectional view of said socket taken along lines 7—7 of FIG. 6.

FIG. 8 is a schematic circuit diagram of the automatic meter reading-recording system.

Figure 2:
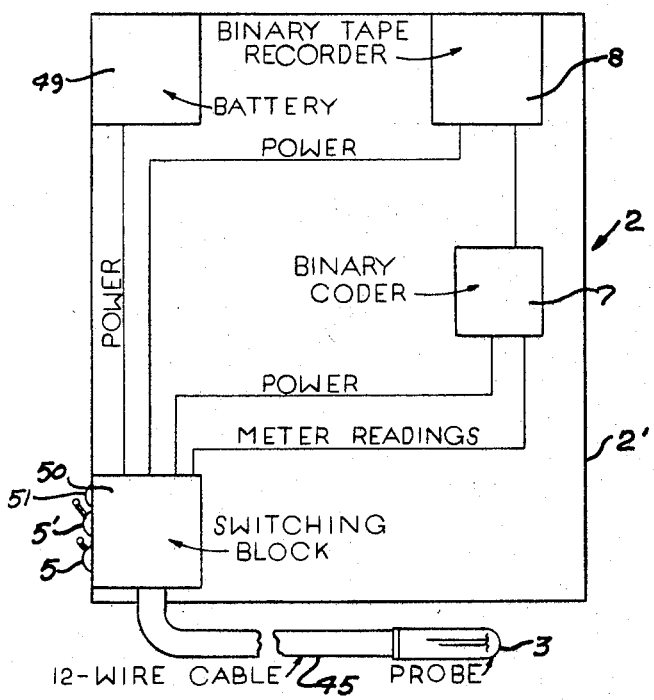
FIG. 2 is a diagrammatic view of the meter reader-recorder device with a probe insertable in the socket of the metering device.

Referring to the drawings in more detail:
The reference numeral 100 generally refers to a meter reading system embodying the features of this invention having a metering device 1 being adapted for automatic meter reading and recording by a portable meter reader-recorder device shown in FIG. 2 and designated by the reference numeral 2. The reader-recorder device 2 which is carried by the meter reader is mounted in a housing 2' and has a probe 3 which the meter reader merely inserts into socket 4 of the metering device 1 and then by actuating switches 5 and 5', the reading of the metering device 1 is automatically recorded on a data processing input means in the reader-recorder device 2. By actuating switches 5 and 5' in a manner to be later described, on the reader-recorder device 2, the meter reader has activated a signal emitting apparatus 6 in the metering device 1. The signals emitted from the metering device 1 are picked up by probe 3 of the reader-recorder device 2 and relayed to a digital coding device illustrated as a binary coder 7 which converts said signals to binary characters. The binary characters are then recorded on a data processing input means illustrated as a tape recorder 8. The reader-recorder device 2 is of such a size and nature that it can be carried in a case which may be supported by the belt of the operator.

The signal emitting apparatus 6 of the metering device 1 is generally comprised of a meter reading section 9, a meter identification section 10 and a standard reading section 11. The meter reading section 9 serves to transmit a series of electrical signals or responses to the reader-recorder device 2 which indicate the actual meter reading. The meter identification section 10 transmits signals or electrical responses to the reader-recorder device 2 which specifically identify the particular meter whose reading is then being recorded. By so identifying the readings of the particular meters, a series of meter readings may be recorded on a single data processing input means such as the tape of recorder 8. The standard section 11 is utilized to calibrate the system to compensate for variations in intensity of the light source and aging of the photoelectric cells.

The metering device 1 is conventional in nature having a plurality of members illustrated as indicator hands 18' moved by the material being metered in a conventional manner to collectively indicate the quantity of the material being metered. The electrical signal emitting apparatus 6 operatively connected to said hands 18' transmits a signal whose intensity or characteristics indicate in a predetermined manner the position of indicator hand 18' and thereby the quantity of material being metered.

Figure 1:
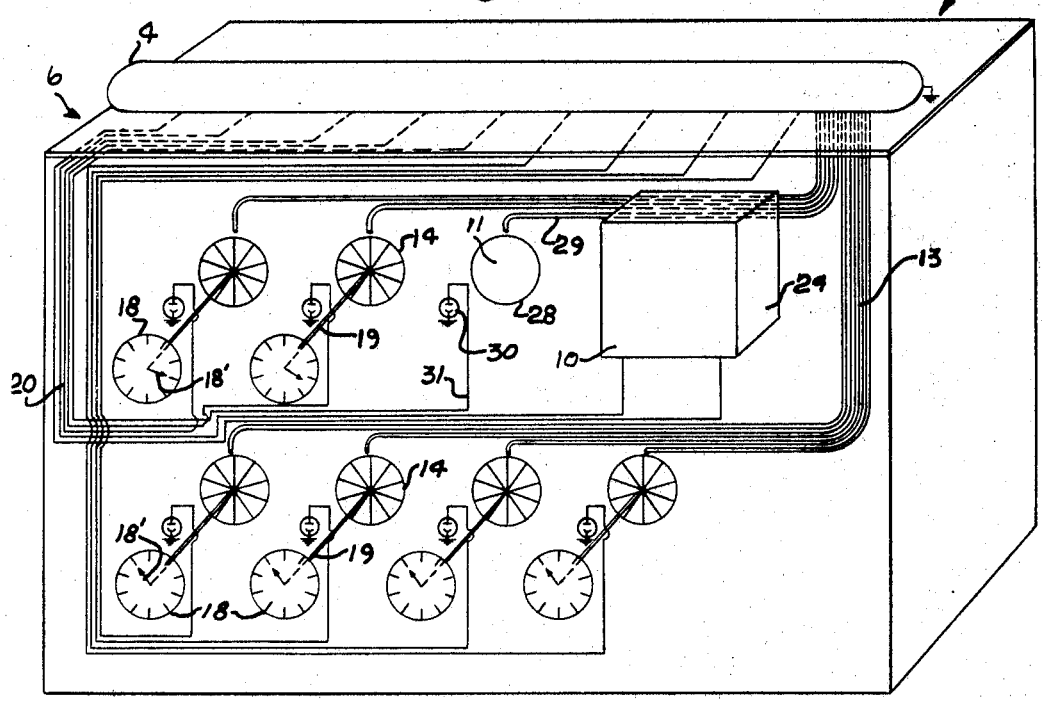
FIG. 1 is a diagrammatic view of a metering device containing the automatic meter reading and recording apparatus.

The meter reading section 9 of the signal emitting apparatus 6 is comprised of a lens 12, a light transmitting system comprised of a plurality of light transmitting conduits such as "Lucite" rods 13, a meter reading indicator having a plurality of transparent sections, illustrated as a transparent disc 14, a mask or plate 15 defining a pin hole or lens opening 16, a photo-sensitive device illustrated as a photoelectric cell 17, a visual meter reading dial 18, an indicator hand 18' on said dial 18 to which the transparent disc 14 is operatively connected by means of a shaft 19 and an electrical wiring system 20 operatively connecting the photoelectric cells 17 to a plurality of contacts 21 mounted in socket 4 of metering device 1. The lens 12 is mounted in socket 4 in a conventional manner as shown in FIG. 6 and serves to receive a beam of light from a light source 22 mounted in probe 3. A light source could be mounted within metering device 1 or individual light sources could be located at each cell 17. The beam of light is transmitted through lens 12 and the plurality of "Lucite" rods 13 to a fixed point adjacent the transparent rotatable disc 14. The plurality of "Lucite" rods 13 are mounted within the metering device 2 in a conventional manner extending from lens 12 outwardly to the various transparent discs 14. As shown in FIG. 1, each indicator hand 18' of metering device 1 has a transparent disc 14 mounted thereto by means of shaft 19 such that a rotation of hand 18' causes a corresponding rotation of the transparent disc 14.

Each of the transparent discs 14 are comprised of a plurality of radial segments 23, each segment 23 varying in degree of transparency from the other segments 23 of the transparent disc 14, with each of said segments 23 corresponding to a calibration on the visual dial 18. The transparent disc 14 and the hand 18' on the visual dial 18 are both connected to the rotatable shaft 19, the rotation of said hand 18' causes a corresponding rotation of the transparent disc 14. The "Lucite" rods 13, plates 15 and photoelectric cells 17 are all mounted within the metering device 1 in a fixed position with plate 15 and photoelectric cell 17 disposed on the opposite side of the transparent disc 14 from the "Lucite" rod 13, such that the beam of light passes through the rotatable transparent disc 14, the pin hole 16 in plate 15 and into the photoelectric cell 17.

The plate 15 with pin hole 16 serves to increase the accuracy of the photoelectric cell 17 as plate 15 blocks out certain light rays which may be reflecting about the interior of the metering device 1.

The intensity of the light received by the photoelectric cell 17 will vary depending upon which segment 23 of the rotatable transparent disc 14 is positioned in line with said light beam. As the standard photoelectric cell emits an electrical response or signal whose strength or characteristics corresponds to the intensity of the light received by the photoelectric cell, the segment 23 of the transparent disc 14 in position in line with the light beam, the position of indicator hand 18' on dial 18 may be determined by an analysis of the strength or characteristics of the electrical response or signal emitted from the photoelectric cells 17. In the illustrated form, the current generated by cell 17 is so analyzed. This analytical process is accomplished by means of a binary coder 7 which converts responses or signals of a certain intensity or having certain characteristics to a specific binary character or byte of data which is then recorded on a data processing input means.

The identification section 10 of the signal emitting apparatus 6 is comprised of an identification module 24, electrical circuit 25 and contacts 26 and 27. When switch 5 on the reader-recorder device 2 is activated, power is supplied to contact 26 and through circuit 25 to the identification module 24. This power input activates a multi-switching circuit within module 24 which emits a pulse train of a series of signals back through circuit 25 to contact 27. The series of signals corresponds to specific binary characters which identify this particular meter from other meters within the metering system. In the illustrated example, the current generated by the cell 17 is analyzed to determine the meter identity.

The standard section 11 of the signal emitting apparatus 6 is comprised of a single transparent disc 28, a "Lucite" rod 29, a photoelectric cell 30, electric wiring 31 and contact 32. When the light source 22 is activated, photoelectric cell 30 transmits a signal through wiring 31 to contact 32 and to the reader-recorder device 2. As the intensity or current from the signal which should be received from the photoelectric cell 30 is known, the actual signal intensity or current received can be compared with the known value to ascertain the accuracy of the readings received from the metering device 1 and/or adjust the readings of the signal emitting system to the proper level.

The metering device 1 is provided with a socket 4 in which probe 3 of the meter reader-recorder device 2 is inserted to obtain the reading from the metering device 1. As shown in FIG. 7, the socket 4 is illustrated as being generally circular in cross section with a keyway 33 extending along its upper edge. As it is important that the probe 3 be inserted into socket 4 in the proper orientation to provide contact between the corresponding contacts of the socket 4 in probe 3, the keyway structure 33 is so provided to orient the probe. It should be noted, however, that this orientation could be accomplished through any number of corresponding shapes of sockets and probes. The contacts 21, 26, 27 and 32 of the socket 4 are illustrated as mounted at the base portion 34 of socket 4 on the interior face 35 of said socket 4. Each of said contacts have concave upper surface 36 designed to receive the convex lower surface 37 of contacts 38 of probe 3. The socket 4 is provided with a lens 12 mounted therein in a conventional manner in such a position that it will be aligned with light source 22 of probe 3 when said probe 3 is completely inserted in socket 4. Socket 4 also contains a ground contact 39 at its forward closed end portion 40 which serves to ground the system 100. A waterproof cover plate 41 is hingedly connected to socket 4 to protect socket 4 from the entry of moisture. Hinge connection 42 is spring loaded to provide an automatic closing of plate 41 upon extraction of probe 3 and to provide a tight seal.

The probe 3 as shown in FIG. 5 is generally circular in cross section having a key 43 along its upper edge corresponding in shape to keyway 33 of socket 4. The outside diameter of the cross section of the probe 3 is slightly less than the inside diameter of the socket 4 to allow probe 3 to be inserted within probe 4, but to maintain a sufficiently snug fitting to insure alignment of contacts 36 with the corresponding contacts in socket 4. The probe 3 has a hollow interior portion 44 which houses cable 45 which operatively connects probe 3 to the reader-recorder device 2. Cable 45 contains a plurality of wires 46 which serve to supply power to the metering device 1, to operate the light source 22 and the identification module 24 and to transmit the signals from apparatus 6 back to the binary coder 7 of the reader-recorder device 2. The light source 22 is mounted within probe 3 in a conventional manner directly adajcent a lens 47 which allows the passage of light from source 22 into the metering device 1. Probe 3 has an end contact 48 which comes in contact with contact 37 in end 40 of socket 4 when probe 3 is inserted into socket 4 to ground the system 100. The socket 4 and probe 3 are each illustrated as being formed of a plastic or synthetic resin material for electrical insulating purposes. Most electrical insulation material could be utilized.

The reader-recorder device 2 as illustrated is operated by battery 49 which supplies power through switching block 50 to the recorder 8, coder 7, the identification module 24 and the light source 22. Such power is supplied by simply activating switches 5 and 5' on the reader-recorder device 2 which also activates an indicator light 51 to tell the operator that the reader-recorder device 2 is on and in operation.

The switching block 50 is comprised of circuitry and relays to provide time delays in the various operational functions of the reader-recorder device 2. After the operator has placed the probe 3 in socket 4, the reader-recorder device is activated by throwing switching 5. As illustrated in FIG. 8, the activation of switch 5 completes a circuit through the switching block 50 to the identification module 24 in the metering device 1. The identification module 24 then returns a pulse train or series of signals to the binary coder 7 through the switching block 50 for conversion to binary characters and recording on the tape recorder 8. A second circuit from the identification module 24 activates relay 52 which makes the circuit to the light source 22 in probe 3. As previously discussed, the light source 22 activates the photoelectric cells 17 and 30, each of which transmits a signal to the reader-recorder device 2. The binary coder 7 then converts the series of signals received from the photoelectric cells 17 to binary characters and said characters are recorded on the tape in the proper sequence. The sequence in which the characters are recorded is established by a time delay switching means such as a time delay switching circuit 53 of a conventional nature which may be located either in the switching block 50, as illustrated, or in the binary coder 7. The time delay switching circuit 53 receives power through an independent circuit from the battery 49.

The signal return from the photoelectric cell 30 of the standard section 10 of the signal emitting apparatus 6 is received in the reader-recorder device 2 in the same manner as the signals from the photoelectric cells 17. The information obtained from photoelectric cell 30 can be utilized in several ways to determine the validity of the remainder of the readings of photoelectric cells 17. The signal from photoelectric cell 30 can simply be converted to binary characters and recorded on the tape as are the signals from the photoelectric cells 17. The validity of the remainder of the readings can then be determined when the tape is run through the data processing operation. As illustrated, the reader-recorder device 2 is provided with an ammeter 54 which indicates the current output from photoelectric cell 30 and either automatically or by manual operation by the operator, the resistance is adjusted for all the signal output circuits by means of a series of rheostats 55 which are simultaneously adjusted to equally adjust the outputs of all the circuits from photoelectric cells 17 to a desired level to compensate for any variations in light intensity emitted from the light source 22 or from deterioration of the various photoelectric cells and provide the proper energy levels to the binary coder 7 to obtain accurate readings. As the various photoelectric cells 17 and 30 are located at different distances from the light source 22, it is necessary to provide varying degrees of resistance in the output lines of cells 17 and 30 to produce signals of related intensities from all the cells 17. In order to accomplish this, the rheostats 55 may be initially set at varying degrees of resistance during the installation of the system. The manual adjustment of the circuit resistance by the operator will increase or decrease the resistance in each output line by an equal amount but will maintain the initial variation of resistance as established in the installation phase to compensate for the differences in distance of the cells 17 and 30 from the light source 22. In such a system, as here illustrated, the amplitude of the current is the characteristic of the electrical signal being analyzed by the converter or coder 7.

The operator then throws switch 5' which makes the circuit between the switching circuit 53 and the binary coder. The switching circuit 53 causes the signals from the photoelectric cells 17 to be passed to the binary coder 7 in the proper sequence for coding and recording on recorder 8. The operator then throws switch 5 to cut off the power and removes probe 3 from the socket 4. The waterproof cover plate 41 automatically swings into place upon removal of the probe 3 to protect the socket 4 from entry of moisture.

Figure 9:
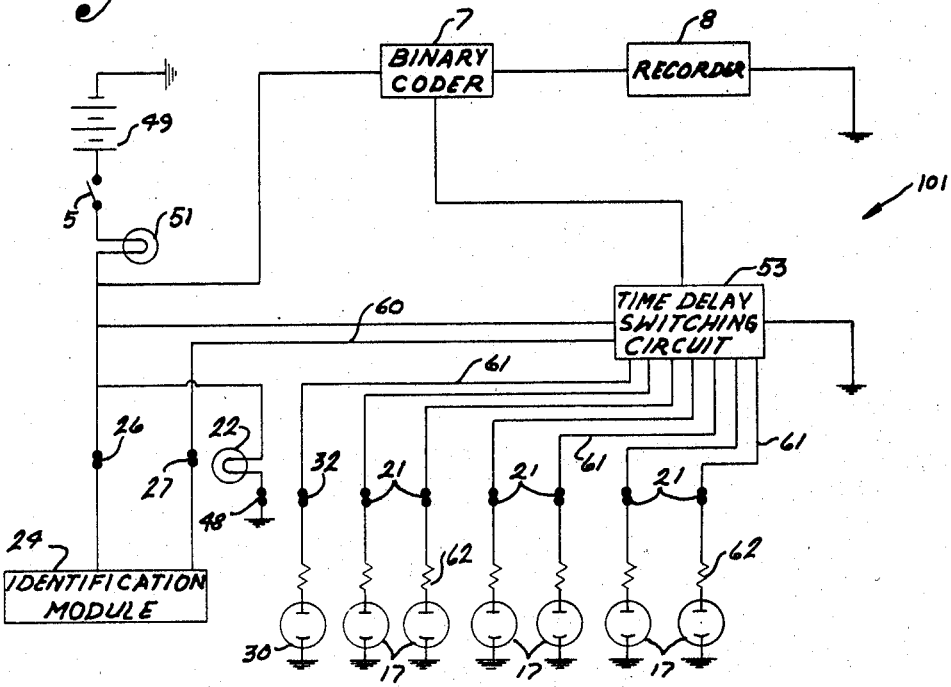
FIG. 9 is a schematic circuit diagram of a modified form of the meter reading-recording system.

Referring to FIG. 9, a modified reading-recording system 101 is illustrated which eliminates the necessity of switch 5', relay 52, rheostats 55 and amplifier 54 shown in system 100. In this embodiment, a control circuit 60 connects the identification module 24 and the switching circuit 53 with control circuits 61 connecting each of the photoelectric cells 17 and the standard 30 with the switching circuit 53. The switch 53 by a timed sequential operation passes the signal from the identification module 24 to the binary coder 7; then the signal from the standard 30 followed in by the signals from the cells 17 in a predetermined order. When the binary coder 7 receives the signal from the standard 30, it sets the coding operation in response to that signal to compensate for certain problems in the system such as cell deterioration or a weak light source which would affect the amplitude of the signals received by the coder 7. Resistors 62 are connected in each of the circuits 61 to compensate for the variation in the distance of the cells 17 and 30 from the light source 22 and the variation of light intensity produced by this difference in distance.

Figure 10:
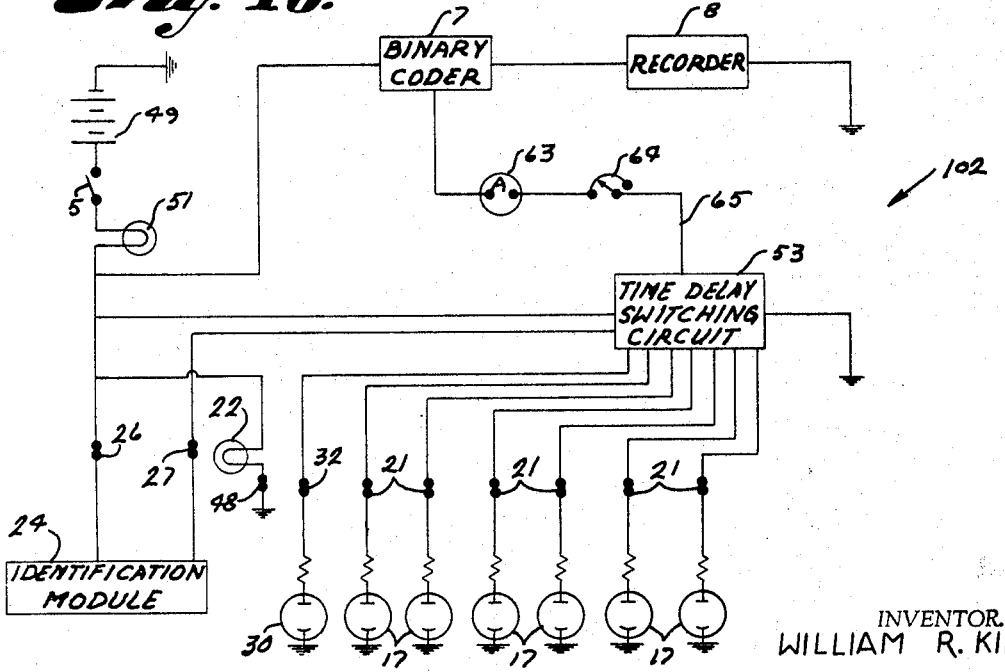
FIG. 10 is a schematic circuit diagram of a modified form of the meter reading-recording system.

Referring to FIG. 10, a second modification is shown and designated as meter reading-recording system 102 which utilizes an ammeter 63 and a rheostat 64 in a control circuit 65 between the timing switch 53 and the binary coder 7 to vary the resistance and thereby vary the intensity of the signals received by the binary coder 7 to adjust the system output in accordance with the reading of the standard 30. In this instance, the operator would activate switch 5 which would produce a reading on ammeter 63. He would then adjust the rheostat 64 to bring the ammeter 63 reading to the desired level, thereby varying the level of intensity of the signals received by the binary coder 7. The signals from the cells 17 are then passed through the switching circuit 53 to the binary coder 7 for coding and then to recorder 8 for recording. The signals from cells 17 may be delayed in the timing switching 53 by designated time periods to allow for adjustment of the rheostat 64 or a throw switch may be connected to timing switch 53 and activated by the operator upon completion of the adjustment to initiate the operation of timing switch 53.

The systems shown in FIGS. 8, 9 and 10 are also applicable where the elements of the reader-recorder device 2 are located continuously at the metering site. In such a situation, the system would be automatically activated at various times and the data from metering device 1 recorded. It is also possible to telemeter the converted data from the coder 7 to a recorder 8 at a remote location. In such a telemetering system, the desired metering devices would have a circuit similar to that shown in the figures built in or attached thereto with the output of the coder 7 operatively connected to a remote recording device of digital computer by telephone lines or other means. Switches 5 and 5' could be remotely activated by conventional circuits in order to obtain the data from the metering site.

The preferred embodiment illustrated herein is especially adapted for utilization in gas meters or other meters utilized in hazardous areas where materials susceptible to explosion may be encountered. The meter 1 itself contains no power source and the signals emitted from the photoelectric cells are of small intensity and not likely to activate explosive materials in the area.

What I claim and desire to secure by Letters Patent is:

1. A reading record system for utilization with metering devices for automatically reading said device and recording said reading comprising:
    (a) a metering device having a plurality of members moved by the material being metered to indicate the quantity or quality thereof, said members each having a light transmitting portion varying in degree with each portion corresponding to a digital unit of metering calibration,
    (b) light source and photosensitive means positioned relative to each member to sense the light transmitted by the light transmitting portions of said movable member of the metering device for emitting electrical responses, the light sensed being that transmitted by the transmitting portion indicating the quantity unit reading whereby said responses have a level of intensity related to the quantity reading of said metering device,
    (c) means engageable with said metering device for receiving and transmitting the electrical responses from said metering device,
    (d) means operatively connected to said transmission means for converting the electrical responses to useable data,
    (e) means operatively connected to the converter means for recording said data.

2. A reading recording system as recited in claim 1 wherein the transmission means contains a means for placing the electrical responses in a predetermined sequence.

3. A reading recording system as recited in claim 1 wherein the metering device has a means operatively connected thereto for emitting an electrical response for transmission to the converting means for identifying the particular meter whose readings are being taken.

4. A reader recorder system as recited in claim 1 wherein said light transmitting portions are transparent and the light source and photosensitive means is comprised of:
    (a) a means operatively connected to the metering device for emitting a beam of light,
    (b) said transparent portions of the respective movable member of the metering device being interposed in said beam of light to vary the light intensity of said beam in relation to the movement of the movable member,
    (c) a photosensitive device on the side of the reading means opposite said light means and adapted to receive the beam of light after said beam passes through the reading means for emitting an electrical response whose energy level is related to the numerical reading of said metering device indicated by the position of the movable member.

References Cited

UNITED STATES PATENTS

| | | | |
|---|---|---|---|
| 3,054,095 | 9/1962 | Heller | 340—188 |
| 3,196,277 | 7/1965 | Rabinow | 340—190 |
| 3,206,719 | 9/1965 | Pure | 340—190 |
| 3,324,438 | 6/1967 | Wapner | 340—188 |

THOMAS B. HABECKER, *Primary Examiner.*

U.S. Cl. X.R.

340—190; 250—217